US008273396B1

(12) United States Patent
Shepard et al.

(10) Patent No.: US 8,273,396 B1
(45) Date of Patent: Sep. 25, 2012

(54) NUT CRACKING DEVICE

(76) Inventors: Mark L. Shepard, Viola, WI (US); John P. Bashaw, Elkhorn, WI (US)

(*) Notice: Subject to any disclaimer, the term of this patent is extended or adjusted under 35 U.S.C. 154(b) by 1307 days.

(21) Appl. No.: 12/005,188

(22) Filed: Dec. 26, 2007

(51) Int. Cl.
*A23P 1/10* (2006.01)

(52) U.S. Cl. ........ 426/478; 426/482; 426/479; 426/481; 99/538; 99/568; 99/539; 99/544; 99/574; 99/575; 99/587

(58) Field of Classification Search ............ 426/478, 426/482, 479, 481; 99/538, 568, 539, 544, 99/575, 574, 587
See application file for complete search history.

(56) References Cited

U.S. PATENT DOCUMENTS

| | | | |
|---|---|---|---|
| 1,427,457 A | 8/1922 | Gillespie | |
| 1,484,563 A | 2/1924 | Riddle | |
| 2,957,633 A * | 10/1960 | Andreas | ............... 241/57 |
| 4,126,280 A | 11/1978 | Burk | |
| 4,393,762 A | 7/1983 | Jacobs | |
| 4,467,710 A | 8/1984 | Verma et al. | |
| 4,665,814 A | 5/1987 | Harborne et al. | |
| 4,690,048 A | 9/1987 | Namdari | |
| 4,996,917 A | 3/1991 | Burlock et al. | |
| 5,415,085 A * | 5/1995 | Thomson | ............... 99/574 |
| 5,427,018 A | 6/1995 | Liebing | |
| 5,697,292 A | 12/1997 | Simmons | |
| 5,711,213 A | 1/1998 | Thomson | |
| 6,135,020 A * | 10/2000 | Broyles | ............... 99/569 |
| 6,516,714 B2 | 2/2003 | Warmack et al. | |
| 7,234,393 B2 | 6/2007 | Lindsey et al. | |
| 7,717,033 B1 * | 5/2010 | Kim | ............... 99/574 |
| 2004/0251357 A1 | 12/2004 | Lenzkes | |

* cited by examiner

*Primary Examiner* — Humera Sheikh
*Assistant Examiner* — Hong T Yoo

(57) ABSTRACT

The hard shells or hulls of whole nuts are effectively cracked and separated from the nut meat by propelling and impacting the whole nuts at a predetermined trajectory velocity against an adjustable impacting plate set at the appropriate impacting angle. By controlling the manner in which the whole nuts impact against the impacting plate, the fracturing of the hard shell may be controlled so as to optimize the whole nut meat recovery while minimizing the production of split nut meats. A variable speed impeller in combination with adjustability of the impacting plate optimizes the nut cracking and nut meat separation for any type of whole nut. An orderly sequential feed of whole nuts to an off-set feed zone of rotating impellers equipped with vanes having a catching section and an accelerating section at a regulated rotational speed effectively propels the whole nuts against the adjustable impacting plate.

8 Claims, 8 Drawing Sheets

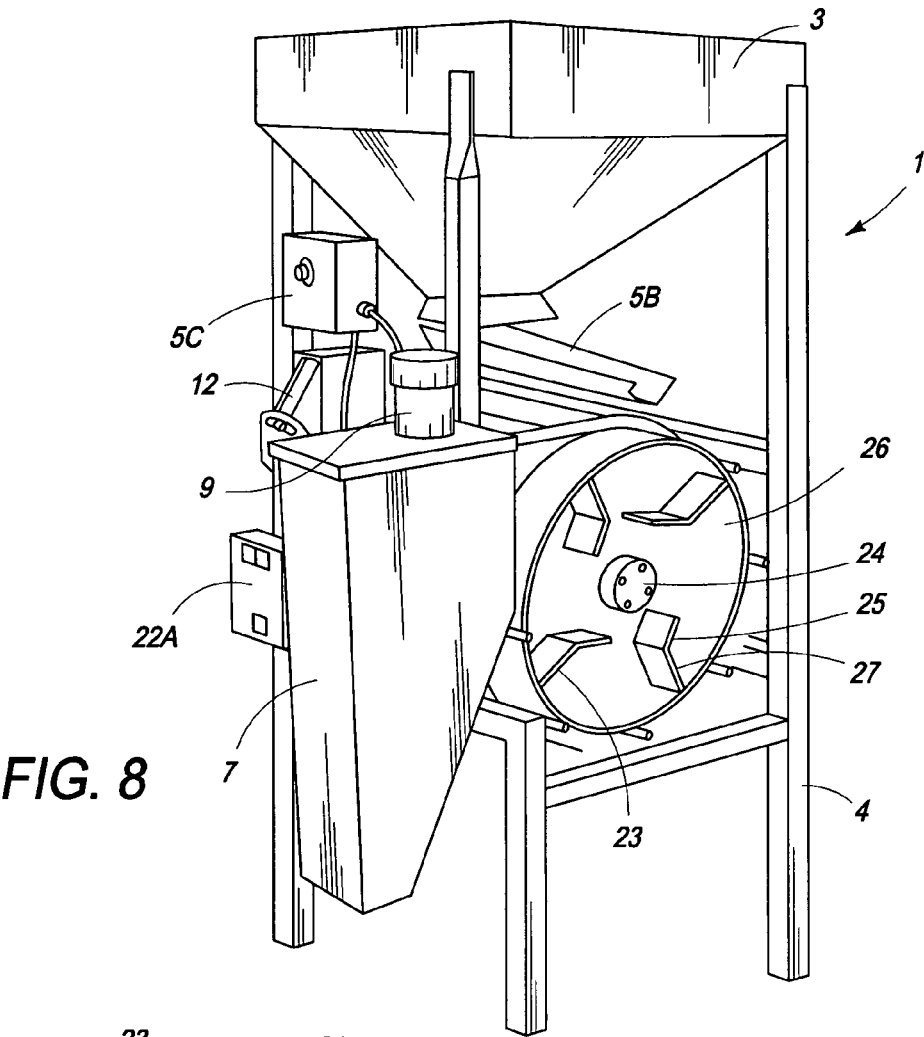
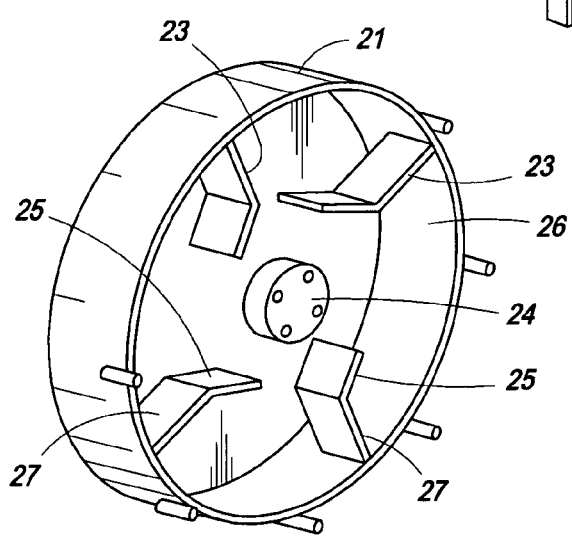
FIG. 8
FIG. 9

NUT CRACKING DEVICE

FIELD OF INVENTION

The present invention relates to cracking devices and more particularly to a nut cracking device and its use.

BACKGROUND OF THE INVENTION

Vast amounts of nuts are conventionally processed by cracking a nut shell to expose the nut meat followed by separating the cracked shell or hull from the nut meat. Nut cracking operations must be fastidiously controlled and typically require elaborate and expensive equipment, must commonly conducted by large manufacturing operations requiring substantial capital expenditures. Nut cracking is a delicate procedure since "over-cracking" can undesirably disintegrate or fragment the whole nut into fragmented pieces or splits while under-cracking makes it most difficult to cleanly separate the hull fragments from the nut meat.

Several different nut cracking systems exist, ranging from an impacting hammer or ram for cracking the whole nut against an anvil or stationary surface, compressing whole nuts between rollers to centrifugally impacting machines which shatter the whole nut against a circumscribing impacting ring. The impact ring cracking systems customarily rely upon a centrifugal impeller typically equipped with a center whole nut feed and radially extending tubes or conduits which conduct uncracked nuts or whole nuts through an outer peripheral impeller outlet which centrifugally casts the whole nuts against an impacting ring which cracks or fractures the outer hull or shell of the nut.

Irrespective of which system is used to crack or dehull whole nuts, considerable difficulty is encountered in effectively fracturing the hull sufficiently so as to expose the nut meat for expeditious separation without further fracturing the nut meat into a number of undesirable smaller nut meat pieces. Conversely, the cracking force must also be sufficient so as to cause effective separation of the hull from the nut meat. Inappropriate nut cracking forces can lead to excessive "splits" or fragmentation which are commercially undesirable or conversely to an incomplete separation of the hull from the nut meat which creates added processing costs to separate and potential injury or damage to the nut meat.

The need to separate the hulls, nut meat and partially dehulled nut meats from one another contributes added expenses to the manufacture of nut meats. Commonly used mechanical separations techniques for separating the shell or hull from the nut meat such as by vibratory and/or air extraction methods tend to not only complicate the separation but become even more complex when the nut cracking leads to incomplete cracking or excessive nut meat breakage. This can result in a need to excessively rely upon labor intensive or hand separation techniques to produce the desired end product. Such extended manufacturing conditions can result in substantial damage to the desired nut meats product. If the nut meat manufacturers were able to more accurately control the manner in which the nut hull is cracked, there would then exist an opportunity to optimize the production of intact whole nut meats and the separation of the nut hulls therefrom. A nut cracking process which would lead to a simultaneous separation of the nut meat from the nut hull would be particularly beneficial to the manufacturers of nut meats.

In view of the aforementioned, there exists a need for a compact and cost effective nut cracking system affording greater efficacy in the dehulling of a nut hull from the nut meat. This would be especially beneficial if the nut cracking system would provide the nut meat in an intact form with nominal splitting or fracturing of the whole nut meat into smaller fragments. Further benefits would arise in nut meat manufacture if there exited a more effective method for separating the nut meat from the hull. It would be further beneficial if the nut cracking system could effectuate simultaneous separation of the nut hull from the nut meat. Since conventional nut cracking plants necessarily rely upon relatively complex and costly equipment, there would exist a benefit for nut growers and localized smaller processing plants, if the nut meat processing plants would be compactly equipped with more affordable but highly effective nut cracking and separation equipment so as to permit processing at or near the growing site.

SUMMARY OF THE INVENTION

The present invention provides an unique nut cracking machine or device which effectively dehulls the nut while minimizing damage to the whole nut meat under processing conditions which leads to effective separation of the nut meat from the nut hull. The nut cracking machine or device includes an adjustable impacting plate preset at a desired predetermined angular position so as to effectuate impact fracturing of the whole nut at fracturing sites conducive to effective separation of the nut meat from the nut hull. Upon the impacting of a propelled whole nut against an impacting plate under the appropriate conditions, it is now possible to achieve a concomitant dehulling of the husk from the nut meat. Pursuant to this invention, a variable speed impeller adjustable to an appropriate revolutionary speed so as to receive a whole nut from a feed source without causing substantial fracture to the received or captured nut and then by centrifugal force having the capacity to propel the whole nut against an impacting plate preset at an appropriate angular position for impacting under an appropriate impacting speed for cracking and separation of the nut meat, unexpectedly superior nut meat production can be achieved. The present invention provides a particular effective system for nut cracking and separating of the nut hull from the nut meat.

The impacting plate most appropriately includes an angular adjusting member which allows the impacting plate to be externally adjusted to an appropriate predetermined angular position which in conjunction with the projectile speed of the impacting nut during its operational use initiates optimum fracturing of the nut hull which then leads to a highly effective separation of the hull from the whole nut meat. The impacting plate serves as a cracking plate which, by reason of its adjustability also serves as a deflecting plate. As a deflecting plate, the angular placement of the impacting plate, in relationship to the speed and trajectory of the whole nut, serves to optimize cracking along the most appropriate hull fracturing points which leads to optimal separation and recovery of the whole nut meat. The deflecting and impacting plate when adjusted to the appropriate deflecting angular disposition will facilitate the positioning of the whole nut along a trajectory pathway which orients the whole nut upon fracturing impact so as to create optimum hull fracture points within the impacted hull to provide a more compete dehulling of the hull from the nut meat while also effectively serving to more effectively separate the hull from the whole nut. The separation may be effectuated by reason the hull and the exposed whole nut meat will follow different gravitational deflection pathways upon impacting and dehulling against the impacting plate, thus leading to a more effective separation thereof. The angular positioning of the impacting plate can accordingly be used to accentuate the respective separation pathways of the hull and nut meat.

An impeller equipped with a whole nut off-set radial feed and whole nut engaging member (as opposed to the conventional reliance upon a center feed of the current impeller systems) may be used to further advantage in the nut cracking and separating device of this invention. Radially positioned whole nut catching and retaining vane sections laterally offset from the impeller hub in combination with a vane accelerating section can be used to advantage to deliver the whole nuts to the impeller and provide the necessary propulsion velocity. The impeller may be provided in the form of rotating cylinder or disc equipped with whole nut retaining vanes positioned along the inner cylinder chamber walls. The vanes may appropriately include a protruding catching section for catching a falling whole nut which by reason of its close proximity to the center rotates a lower centrifugal speed in conjunction with a whole nut feed in juxtaposition to a rotational pathway of the catching section permits a gravitationally falling whole nut to be caught by the rotating impeller catching section at a reduced speed so as to thereby alleviate premature hull or whole nut fracturing. By accelerating the captive whole nut along an outwardly centrifugal pathway served by the accelerating section onto a trajectory outlet at a desired or appropriate trajectory speed for effective impacting against the impacting plate, a unique whole nut cracking system is provided by this invention. This cooperative combination provides a particular effective device for effectuating both the dehulling and separation of the nut meat from the hull. The impeller vanes may be appropriately designed so as to allow gentle catching of the falling nut in the slower moving catching section of vane so as to avoid premature shattering of the whole nut. By channeling the whole nut from a slower more central impeller catching position to a faster outer radial impeller position as served by the accelerating section, the impeller design allows the whole nut to accelerate to a desired trajectory speed for the optimum impacting and cracking velocity of the nut hull against the impacting and deflecting plate. Also the whole nut as it gravitationally falls will generate gravitational speed so as to more equally correspond with the inner vane speed of the catching section, thus reducing the impacting force against the whole nut in the impeller unit.

The nut cracking and separating device will advantageously combine the features of an adjustable impacting plate which may be easily adjusted to the appropriate impacting and deflecting position and an impeller which includes variable speed adjustment so as to permit monitoring the impeller to the optimum R.P.M. for the nut cracking and nut meat separation operation. The particular unique combination uniquely fractures the nut hull to provide a particularly effective device and process for separating nut meats from the encapsulating hulls.

BRIEF DESCRIPTION OF THE DRAWINGS

FIG. 8 is a view of FIG. 2 showing the impeller cover removed so as to reveal the internal workings of the impeller.

FIG. 9 is an enlarged view of the impeller shown in FIG. 8.

DETAILED DESCRIPTION OF THE INVENTION

There exists a host of variations in whole nut characteristics which can significantly alter the most appropriate conditions for cracking any given nut at any given time. The particular nut species as well as normal and seasonal variations in husk thickness, hull strengths, moisture content, nut size, etc., are amongst those factors which can significantly alter the fracturing characteristics of whole nuts. The present invention provides an ability to effectively monitor and control those vital nut cracking variables and characteristics so as to lead to optimization in the cracking and separation of the nut meats from the nut hulls. By controlling the velocity of the propelled whole nut and the angle upon which the whole nut impinges against an impacting surface, the vital nut cracking attributes for any given lot of whole nuts can be effectively achieved.

Figure 1:
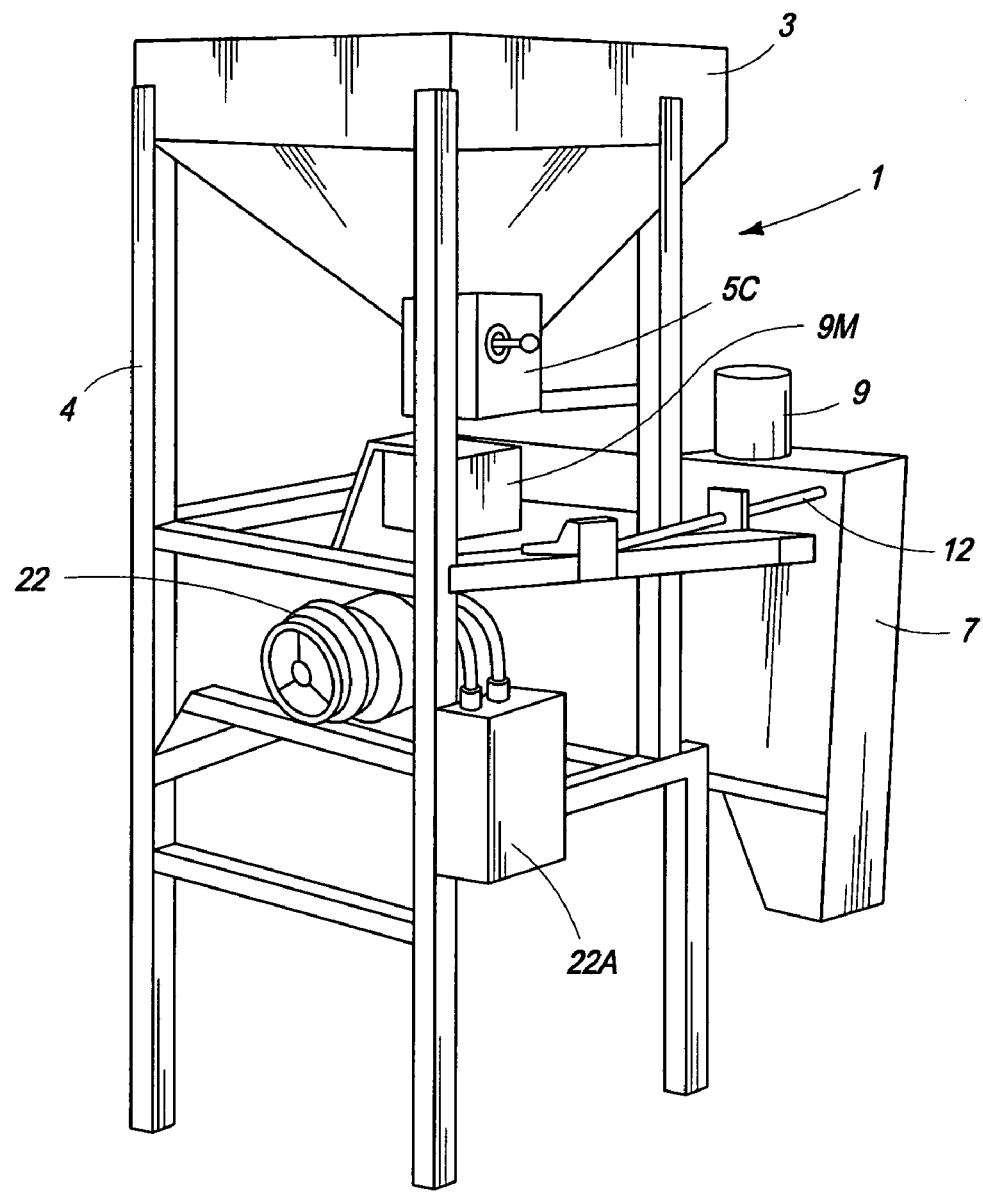
FIG. 1 is an elevational rear side view of the nut cracking device of this invention.
Figure 2:
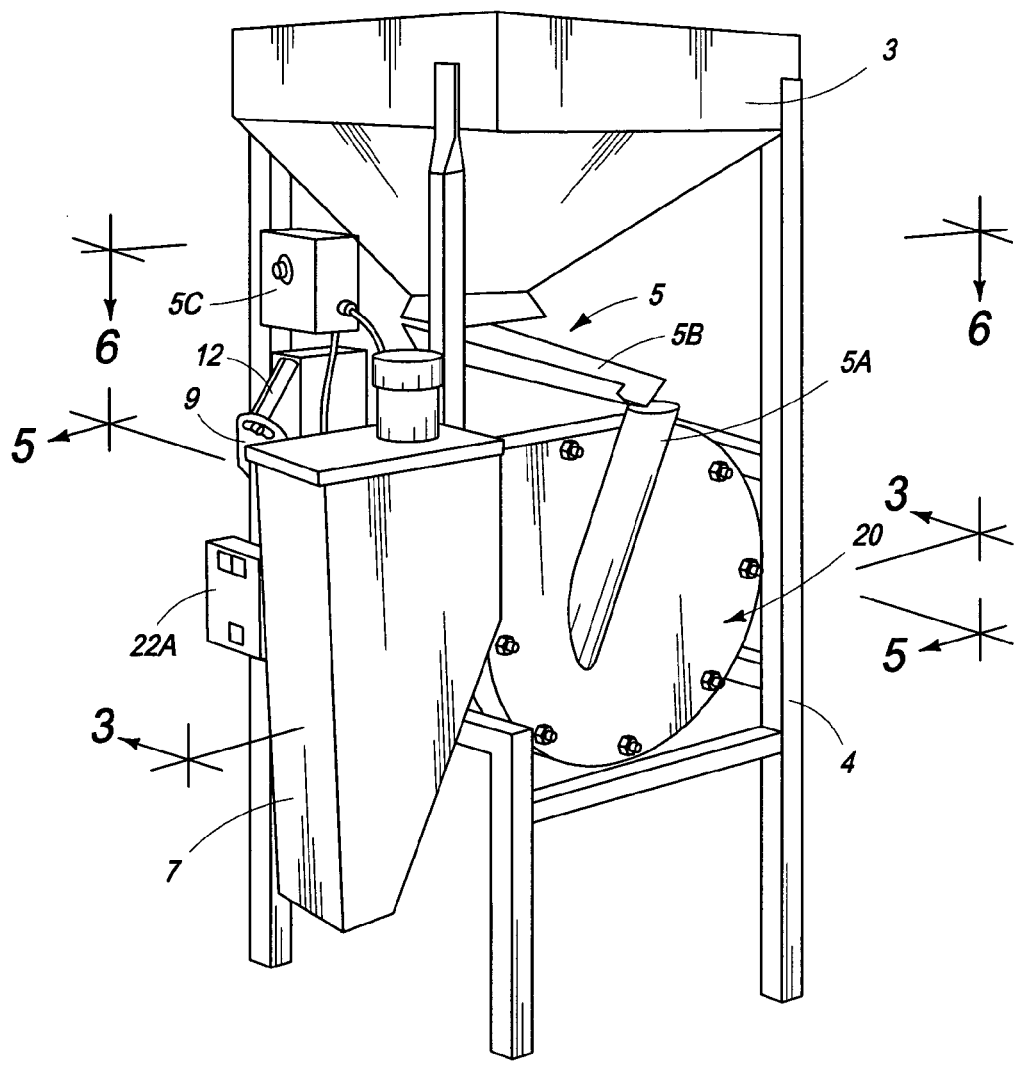
FIG. 2 is an elevational frontal side view of FIG. 1.
Figure 3:
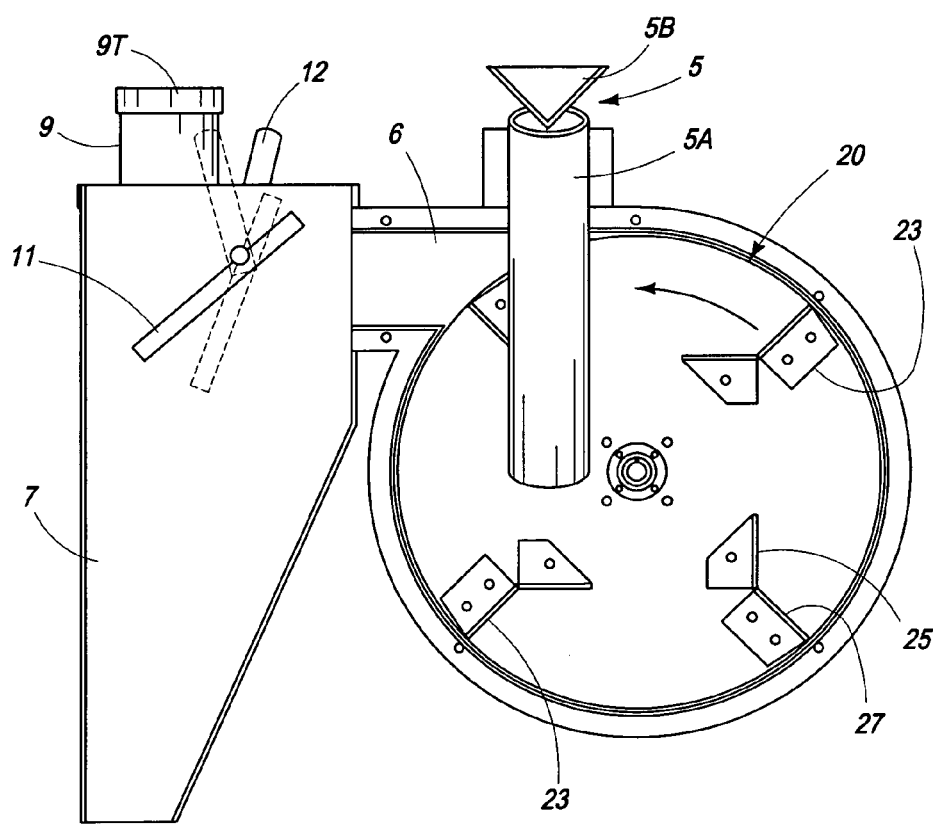
FIG. 3 is a cross-sectional view of the nut cracking device taken along line 3-3 of FIG. 2.

With reference to the Figures, FIGS. 1 and 2 depict elevational frontal and rear side views of the nut cracking device 1 of this invention. The external views of FIGS. 1 and 2 depict a hopper 3 for holding whole nuts for processing, an impeller unit (generally referenced as 20), a motor 22 for powering an impeller 21, a feeding member 5 for orderly feeding nuts to the impeller unit 20 and an impacting and separation chamber 7 for cracking and separating the cracked hulls from the nut meat product, all compactly supported by standing frame 4. The impacting and separation chamber 7 may be appropriately equipped with a dust collector 9 (vacuum operated filtering system) for collecting dust particles from the cracking and separation chamber 7. The nut cracking and separation device 1 may be suitably equipped with control center 8 for regulating the R.P.M.'s (i.e. rotational speed) of the impeller 21, the angular positioning of the deflecting and impacting plate 11 and the vacuum pressure for collecting filtered dust from the impacting and separation chamber 7. The vacuum source may be provided by a negative pressure fan (not shown) powered by a variable speed motor venting onto a dust collector trap 9T. A variable speed motor 22 suitably equipped with impeller motor controls 9M enables the operator of the device 1 to regulate the impeller 21 rotational speed so as to achieve optimum fracturing of the whole nut hull along those fracture points which leads to the optimum separation of the whole nut meat from the cracked hull. The depicted device includes a main power bracket box 22A.

The depicted nut cracking device includes a hopper 3 for holding whole nuts N for processing, a selective feeding member 5 including a nut feed tube 5A sized so as to accept and feed the whole nuts N in an orderly manner such as sized and monitored to feed only one whole nut at a time to an impeller unit (generally referenced as 20) which serves as propellant to accelerate a whole nut N to an appropriate trajectory velocity, referred herein to as a "predetermined trajectory velocity". The depicted feeding member 5 includes a vibrating tray feed 5B, the vibrating rate of which is electronically controlled by vibrating feed tray control 5C. The vibrating tray 5B of selective feed member 5 discharges onto a gravitational feeding tube 5A which sequentially discharges whole nuts N in timed sequential intervals onto feeding zone Z within an impeller chamber 26 housing the impeller 21 of the impeller unit 20, the internal workings of which are largely occluded from views of FIGS. 1 and 2 but shown in more detail by the cross-sectional views of FIGS. 3-6 and open views of FIGS. 8 and 9. If multiple nuts are fed to the impeller 21, the nuts N fed to the impeller should be fed in such a manner (e.g. lateral displacement or spacing) so as to avoid undesirable commingling and impacting multiple nuts at a common cracking site.

The impeller unit 20 propels whole nuts N through discharge chute 6 along a trajectory flight F at predetermined trajectory velocity onto the cracking and separation chamber 7 which, in turn, houses an adjustable impacting and deflecting plate 11. The cracking and separation chambers 7 may most appropriately include a vacuum dust control unit 9 to assist in maintaining a relatively dust free processing environment. The velocity and angular positioning of the adjustable impacting plate 11 may be especially designed to optimize fracturing of the whole nut N against the impacting plate 11 at hull fracturing points which leads to most effective dehulling of the nut meats.

The impeller 21 may be suitably powered by a variable speed power source 22 such as variable speed electric motor 22 which enables the R.P.M.'s of the impeller 21 to be adjusted to the optimum speed for propelling the whole nut N against the impacting plate 11. Although various different variable speed systems (e.g. belts, pulleys, variable speed clutches, etc.) may be utilized to achieve a variable impeller speed and the desired concomitant predetermined trajectory velocity, a variable speed electric motor 22 which permits the impeller 21 to be driven at the most appropriate centrifugal force for optimum fracturing of the whole nuts at the desired trajectory velocity against the adjustable impacting plate 11 provides a particularly cost effective operational system.

Figure 4:
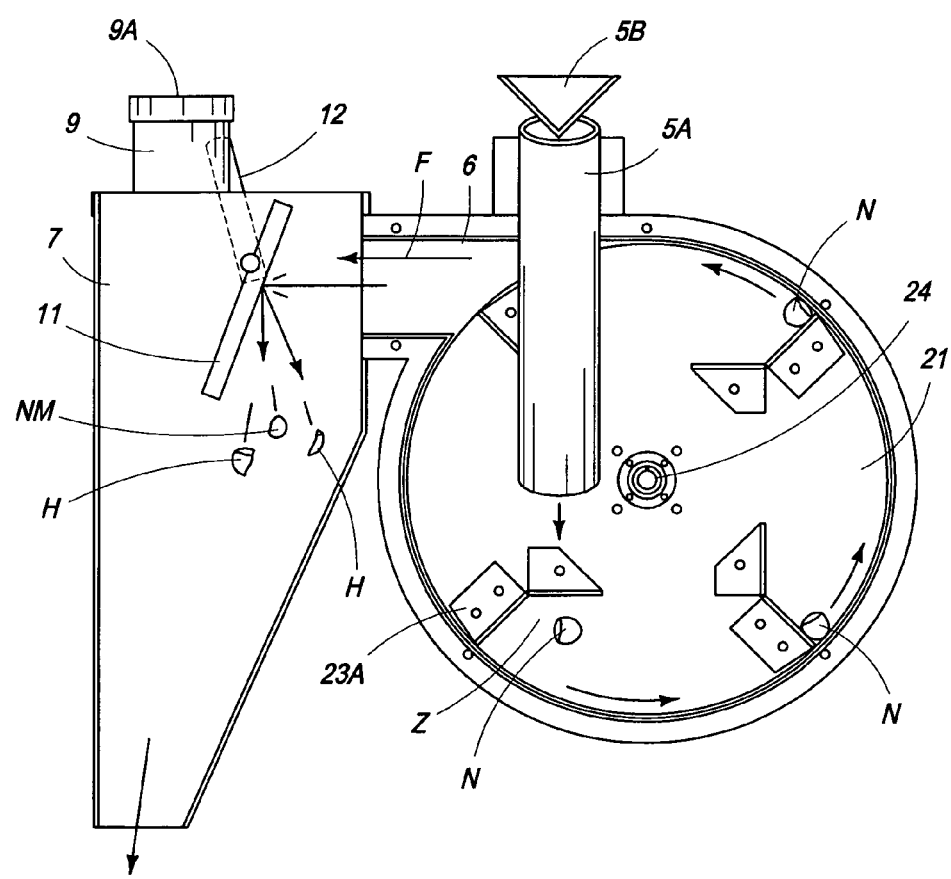
FIG. 4 is a view of FIG. 3 depicting the operational use of nut cracking device.
Figure 7:
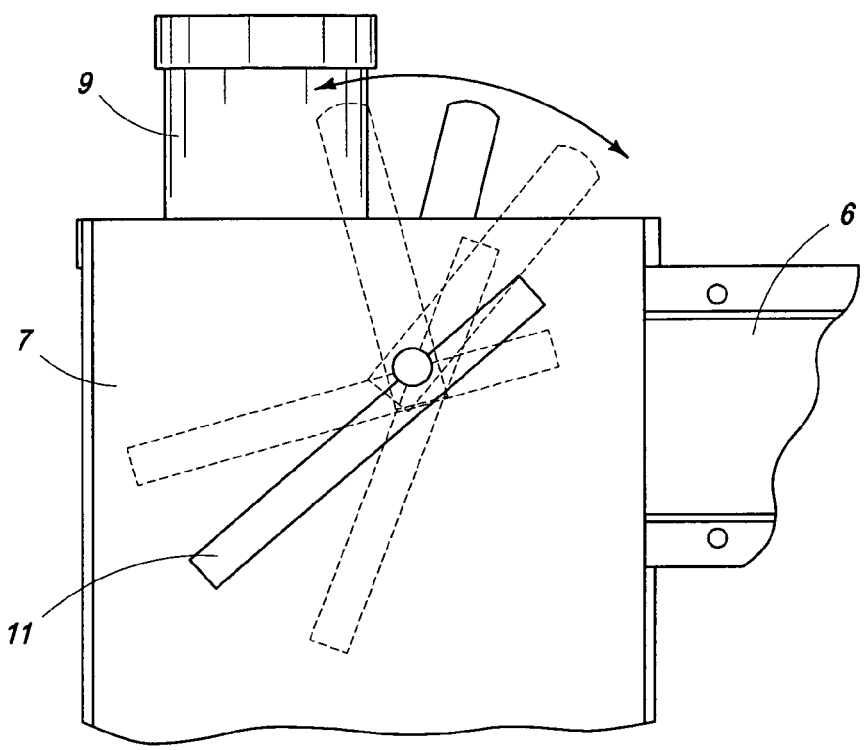
FIG. 7 is an enlarged view of the impacting plate shown in FIG. 4 with phantom lines illustrating the adjustable features of the impacting plate.

As typified by the arrowed lines in FIG. 4, the velocity of the impacting nut N and the angle of whole nut deflection upon impact the plate 11 plays a vital role in the overall optimization of the cracking and separation process. The impacting plate 11 may appropriately include an externally controllable pitch adjusting member 12 such as the depicted manual adjusting rod 12 which operationally allows for adjusting plate 11 to the proper deflection angle to provide the desired predetermined angular position for the whole nut cracking process. The adjustable features of the impacting plate 11 are illustratively depicted by the phantom line depictions of FIGS. 3 and 7. If desired, the adjustable impacting plate 11 as well as the trajectory velocity may be monitored and adjusted as needed throughout the nut cracking and separation process to assure that the optimum angular impacting plate positioning and impacting speed have been achieved for any given nut fracturing and separation operation. The nut cracking device 1 allows for the most appropriate angular setting of the deflection and impacting plate 11 for any given type of nut which in conjunction with the ability to control the velocity of the nut upon impacting against the plate 11 enables one to optimize the effectiveness of the nut cracking and separation operation.

The internal working component parts of the nut cracking device 1 of this invention are shown in greater detail by the internal views of FIGS. 3-9. The adjustable impacting plate 11 necessarily relies upon propelling member 20 to deliver a propelled whole nut N onto the impacting plate 11 at the appropriate impacting speed for the optimum cracking and whole nut meat separation. The ability to establish a preset or predetermined trajectory velocity to optimize the fracturing of the whole nut hull at the appropriate hull fracturing points provides a unique ability to achieve optimum fracturing of the whole nut N against impacting plate 11 for the particular type of nut being processed by the cracking and separation device 1.

Although numerous propelling members 20 such as gas or combustion charged rifles or cannons, spring loaded mechanical propelling devices, etc., may be used as a propelling member 20, a rotating impeller 21 rotating about a central axis or axle 24 equipped with an adjustable propelling source 22 such as a variable speed motor 22 to adjustably regulate the centrifugal speed or RPM of the impeller unit 20, provides a particularly effective propelling member 20.

The nut cracking and separation device 1 may be designed so as to include a unique system for delivering the whole nut N to the impeller 21. Unlike conventional impeller systems which generally feed the whole nuts to the center or hub of the impeller, the depicted nut cracking and separating device 1 effectively utilizes the gravitational forces of a falling whole nut N fed at a laterally off-set position from the impeller hub or axle 24 and traveling at a regulated gravitational velocity which in combination with a impeller vane 23 speed at a nut capturing point is designed to minimizes cracking of the whole nut against impeller vanes 23 of the impeller 21.

The cross-sectional views of FIGS. 3-6 depict in greater detail a unique feed for delivering regimented whole nuts to the impacting plate 11 for effective cracking and separation. The feeding and delivery of whole nut to the impeller unit 20 embodies uniquely different features from the current whole nut feeding and delivery systems. To maintain a disciplined nut feeding system and prevent inadvertent shattering of nuts against the processing machinery and amongst the nuts themselves, an orderly feed or flow of whole nuts N is fed onto the impeller chamber 26. The whole nuts N are admitted in an orderly sequence to free fall into the impeller chamber 26 at a sufficient gravitational speed so as to substantially reduce premature fracturing of the whole nut. If the nut gravitational speed is not appropriately synchronized with the impeller vane 23 speed, such premature fracturing may be caused by impinging and cracking of the nuts against the impeller vanes 23. This will adversely effect the ability to create the desired initial fracturing of the whole nut at the impacting plate 11 at the appropriate impacting speed and angle. The gravitational speed at which the whole nut N comes into contact with the impeller vanes 23 may be accordingly regulated by the distance the whole nut N is allowed to free fall (e.g. through feeder tubes 5) before the whole nut ultimately comes in contact with an impeller vane 23.

Figure 5:
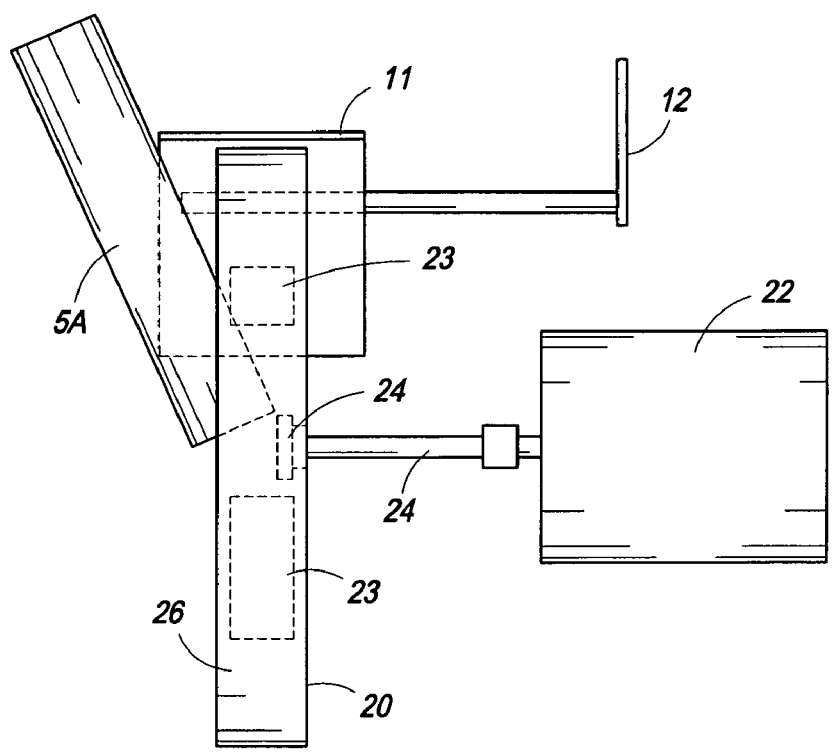
FIG. 5 is a cross-sectional rear view of the nut cracking device taken along line 5-5 of FIG. 2.
Figure 6:
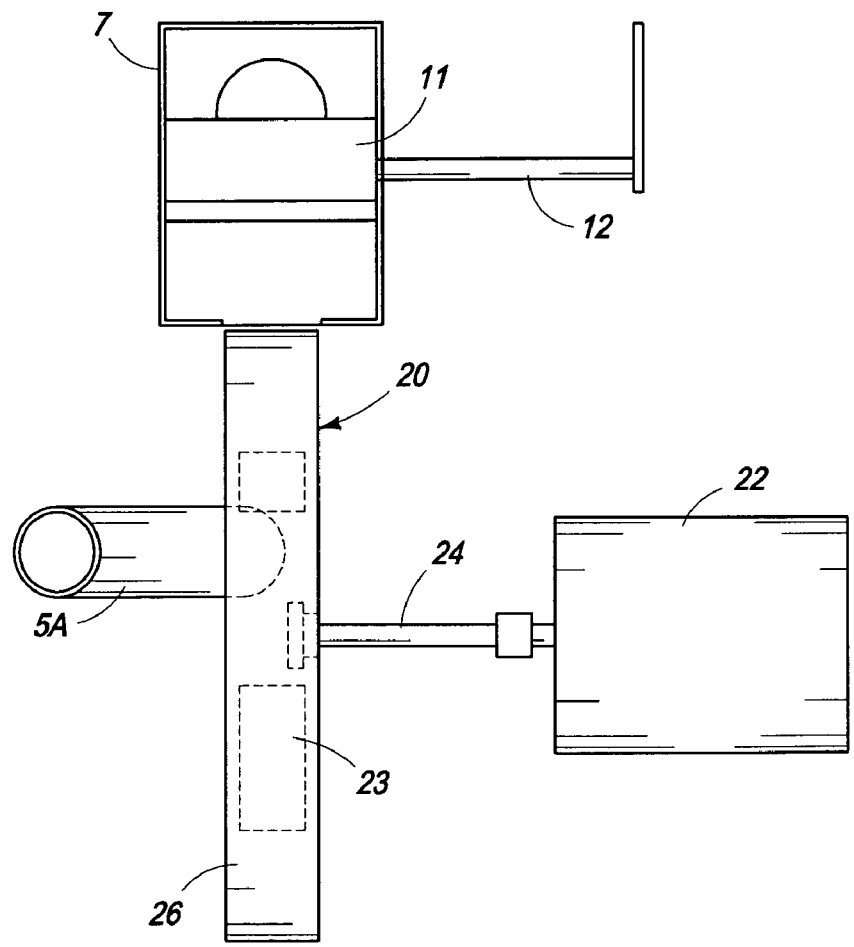
FIG. 6 is a cross-sectional top view taken along line 6-6 of FIG. 2.

As may be further observed from the FIGS. 3-6 (wherein the phantom lines of FIGS. 5 and 6 illustrates the feeding tube 5A and vane 23 positioning relative to impeller hub 24), the feed inlet 5A to impeller chamber 21 is off-set from the impeller hub or impeller 24 and at an impeller capturing site traveling at a lesser velocity than the more outer most peripheral regions of the impeller 21. As may also be observed by the nut processing depiction of FIG. 4, the falling flight of the whole nut N and the rotational pathway of the initiating impeller vane 23A are both appropriately positioned to minimize the impacting force of impeller vane 23A has upon while nut N which in cooperative combination with the gravitational speed of falling whole nut N, negates any substantial premature cracking of the whole nut N. Although other feeding mechanisms designed to accelerate the velocity of the whole nuts fed to a comparable speed of the impeller vanes 23 may be used, a gravitational feed system feeding off center onto the impeller disc is cheap and effective.

With reference to FIG. 4, a catching section 25 of impeller vanes 23 serve to capture the gravitationally falling whole nuts individual fed from whole nut feeder inlet 5A for an orderly delivery to impacting plate 11. The impeller vanes 23 may be designed to include a leading forward protruding section 25 (often referred to as the "catching section") which serves to initiate entrapment of a falling whole nut N within a servicing area of catching vane 23A as it passes through the nut feeding or catching zone Z within chamber 26. The protruding section 25 projects forwardly in the direction of impeller rotation and typically rests at an obtuse angular disposition to the accelerating vane section 27 of impeller vanes 23 (referred for illustrative purpose as 27A and vane 23A in FIG. 4). The impeller vanes 23 generally rest in a transverse relationship to the rotational movement of impeller 21. In operational use, the delivery of the whole nuts N to the rotating impeller 21 may be appropriately controlled so that only one whole nut N is delivered to the capturing section 25 of each revolving vane 23 as each vane 23 passes through the whole nut feeding or catching zone Z. This individual delivery of one whole nut at a time to each revolving vane 23 upon each revolution provides for a more orderly movement of the whole nuts N through the nut cracking device 1 while also diminishing the effects of premature and improper fracturing of the whole nuts N. The impeller vanes 23 collectively serve to catch and accelerate the falling and entrapped whole nuts N to a proper trajectory speed for impacting against impacting plate 11.

The impacting plate 11 serves not only to crack the whole nut in a form which more easily allows for the separation of the hull from the nut meat but also permits simultaneous separation of the hull from the nut meat after impact cracking. The ability to effectuate this separation reflects upon the efficacy of cracking the whole nut so that whole nut meat is free from entanglement with the hull. The efficacy of the cracking and separation is further reflected by the ability to recover more than a major weight portion of the nut meat in the whole nut meat form and under optimum operational conditions a whole nut meat separation substantially free from fractional or split nut meat pieces.

The nut cracking and separation device 1 of this invention may be utilized to dehull and separate a variety of different nuts such as peanut, Brazil, almonds, hazel, cashews, pistachios, pine nuts and the like. The device and its use may be most effectively utilized for the dehulling of the hard shelled nuts. Depending upon the nut type, the trajectory speed of the propelled whole nut, the angular positioning of the deflecting and impacting plate 11, the rotational speed of impeller 21 and gravitational speed of the whole nut feed to the impeller 21 are processing variables which may be appropriately adjusted to effectuate the desired and optimum cracking and whole nut meat separation for any give type of nut.

The nut cracking and separation device has been found to be particularly useful in the manufacture of whole hazel nut meats. Depending upon the particular hazel nut characteristic, the rotational speed of impeller 21 will typically be adjusted so as to propel the hazel nut N for impacting against the impacting plate 11 at a trajectory speed (at exiting chute 6) ranging from about 40 to about 70 mph for impacting plate angular positioned at an angle ranging from about 30 degrees to about 90 degrees (relative to the trajectory flight F of the impelled whole nut N which generally rests in substantial longitudinal alignment with the entrance chute 6). By monitoring the separated fractured hulls and recovered nut meat product, the most appropriate processing conditions may be accordingly adjusted in any given nut operation so as to optimize the end production of the desired whole nut meat with nominal breakage of the whole nuts into smaller nut meat pieces.

The nut cracking device 1 results in a highly effective cracking and separation of the hull H from the nut meat NM or kernel when run at the appropriate exiting velocity from the impeller 21 and angular positioning of the impacting plate 11. Correctly operated only nominal, if any, incomplete separation of the hull H from the nut meat NM will occur. If the impacting velocity is too high, shell or hull fragments H can become embedded in the nut meats NM coupled with excessive hull H fracturing and creation of excessively fractured nut meat NM into smaller pieces. Upon successful cracking and separation of the nut meat NM from the shell H, the discharge from cracking and separation chamber 7 may be passed through a conventional sorter for sorting the nut meats NM from the hulls H.

What is claimed is:

1. A method for effectively cracking whole nuts and separating cracked nut hulls from nut meats with a nut cracking device which consists essentially of a feeding member for selectively feeding whole nuts to the nut cracking device, an adjustable propelling member equipped to receive whole nuts from the feeding member and propel the whole nuts at a desired predetermined trajectory velocity and an adjustable impacting plate adjustable to a desired predetermined angular position for cracking nut hulls of the propelled whole nuts impacting thereupon so as to thereby expose shelled nut meats therewithin for separation therefrom, said method consisting essentially of:
   a) selectively feeding and delivering the whole nuts to the adjustable propelling member adjusted to the desired predetermined trajectory velocity so as to achieve a desired level of cracking and separation of the shelled nut hulls from the nut meats upon impacting and cracking of the whole nuts against the adjustable impacting plate;
   b) adjusting the adjustable impacting plate to the desired predetermined angular position so as to achieve in combination with the desired predetermined trajectory velocity a desired level of cracking and separation of the shelled nut hulls from the nut meats upon the impacting and the cracking of the whole nuts upon the adjustable impacting plate;
   c) cracking the whole nuts by propelling the whole nuts at the predetermined trajectory velocity against the adjustable impacting plate preset at the desired predetermined angular position so as to cause the nut hulls to crack and separate from the shelled nut meats upon the impacting thereupon; and
   d) the shelled nut meats separated from the cracked nut hulls.

2. A method for effectively cracking whole nuts and separating cracked nut hulls from nut meats with a nut cracking device which device consists essentially of a feeding member for selectively feeding whole nuts to an adjustable propelling member equipped to propel the whole nuts at a desired predetermined trajectory velocity, said adjustable propelling member being equipped with an impeller disc having a plurality of vanes with each of said vanes having an accelerating section radially extending inwardly from an outer peripheral margin of said impeller disc and a terminating catching section disposed at an obtuse angular relationship to said accelerating section with each catching section being rotationally positioned upon said impeller disc within a rotational pathway so as to catch a whole nut falling within a catching zone serviced by said catching section, a variable speed power source for powering the impeller disc at a desired rotational speed so as to provide the desired predetermined trajectory velocity to cause cracking of the whole nuts and separation of the cracked nut hulls from the nut meats, the feeding member includes a hopper and a feeding tube for sequentially feeding whole nuts in a sequential pattern so that a controlled number of whole nuts are gravitationally admitted to the catching zone upon each rotational passage of each catching section through the catching zone, an impacting plate chamber housing an adjustable impacting plate having an external control for angularly adjusting the adjustable impacting plate to a desired angular position, said method consisting essentially of:
- a) adjusting the impeller disc to the desired rotational speed and pre-setting the adjustable impacting plate to the desired angular position to create the desired level of hull cracking and shelled nut meat separation from the hull upon the impacting of the whole nuts against the adjustable impacting plate;
- d) sequentially feeding whole nuts in sequential patterns so that the controlled number of whole nuts are gravitationally admitted to the catching zone;
- c) propelling and impacting the whole nuts retained within said catching zone with said impeller disc onto the adjustable impacting plate so as to cause separation of the cracked nut hulls from the nut meats; and
- d) separating the cracked nut hulls from the nut meats.

3. The method according to claim 2 wherein the feeding tube is selectively sized to gravitationally feed a single whole nut to the catching zone upon each successive rotational pass of each respective catching section through said catching zone.

4. The method according to claim 2 wherein the desired trajectory velocity of the whole nuts propelled against the impacting plate ranges from about 40 to about 70 miles per hour.

5. The method according to claim 3 wherein in relationship to propelling trajectory path of the whole nut onto the adjustable impacting plate, the method includes the adjusting of the adjustable impacting plate to an angular position ranging from about 30 to about 90 degrees.

6. The method according to claim 5 wherein the whole nuts selectively fed to the cracking device consists essentially of hazel nuts.

7. The method according to claim 6 wherein the impacting plate chamber comprises a negative pressure chamber equipped with a filter for removing fine particles created by the cracking of the hazel nuts against the adjustable impacting plate and the method includes filtering and removing the fine particles with said filter while maintaining a negative pressure within said impacting plate chamber.

8. The method according to claim 4 wherein the method includes monitoring the separated shelled whole nut meats for excessive nutmeat splitting and thereafter making adjustments to the desired trajectory velocity and the angular position of the adjustable impacting plate so as to reduce the splitting of whole nut meats produced by the device.

* * * * *